United States Patent
Tschache

(10) Patent No.: US 10,303,886 B2
(45) Date of Patent: May 28, 2019

(54) COMPONENT FOR PROCESSING A PROTECTABLE DATUM AND METHOD FOR IMPLEMENTING A SECURITY FUNCTION FOR PROTECTING A PROTECTIVE DATUM IN SUCH A COMPONENT

(71) Applicant: VOLKSWAGEN AG, Wolfsburg (DE)

(72) Inventor: Alexander Tschache, Wolfsburg (DE)

(73) Assignee: VOLKSWAGEN AG (DE)

( * ) Notice: Subject to any disclaimer, the term of this patent is extended or adjusted under 35 U.S.C. 154(b) by 157 days.

(21) Appl. No.: 15/434,304

(22) Filed: Feb. 16, 2017

(65) Prior Publication Data

US 2017/0243011 A1 Aug. 24, 2017

(30) Foreign Application Priority Data

Feb. 18, 2016 (DE) .......... 10 2016 001 849
Jun. 16, 2016 (DE) .......... 10 2016 210 788

(51) Int. Cl.
*H04L 29/06* (2006.01)
*G06F 21/60* (2013.01)
(Continued)

(52) U.S. Cl.
CPC ............ *G06F 21/60* (2013.01); *G06F 21/602* (2013.01); *G06F 21/6218* (2013.01); *G06F 21/71* (2013.01); *G06F 21/72* (2013.01); *H04L 9/006* (2013.01); *H04L 9/0631* (2013.01); *H04L 9/0637* (2013.01); *H04L 9/085* (2013.01); *H04L 9/0877* (2013.01); *H04L 9/3247* (2013.01)

(58) Field of Classification Search
CPC ........ G06F 21/60; G06F 21/602; G06F 21/71; G06F 21/72; H04L 9/0631; H04L 9/0877
See application file for complete search history.

(56) References Cited

U.S. PATENT DOCUMENTS

| 8,949,929 B2 * | 2/2015 | Kelly | G06F 21/53 455/410 |
| 9,135,459 B2 * | 9/2015 | Kim | G06F 21/78 |

(Continued)

FOREIGN PATENT DOCUMENTS

| DE | 102007058975 A1 | 6/2009 |
| DE | 102008048162 A1 | 3/2010 |

(Continued)

OTHER PUBLICATIONS

Helig et al.; Autosar ISO 26262; Coexistence of safe and non-secure software on a control unit; Sonderheft electronica; 2012; pp. 62-65.

(Continued)

*Primary Examiner* — Amir Mehrmanesh
(74) *Attorney, Agent, or Firm* — Barnes & Thornburg LLP

(57) ABSTRACT

A component for processing a datum requiring protection, which component implements at least one security function for protecting the datum requiring protection, and a method for implementing a security function for protecting a datum requiring protection in such a component. The datum requiring protection is assigned to a protection target class. The security function includes at least one protective measure from a selection of protective measures associated with the protection target class.

9 Claims, 3 Drawing Sheets

(51) Int. Cl.
  *G06F 21/71*  (2013.01)
  *G06F 21/72*  (2013.01)
  *H04L 9/06*   (2006.01)
  *H04L 9/08*   (2006.01)
  *G06F 21/62*  (2013.01)
  *H04L 9/00*   (2006.01)
  *H04L 9/32*   (2006.01)

(56) References Cited

U.S. PATENT DOCUMENTS

| | | |
|---|---|---|
| 2008/0192929 A1 | 8/2008 | Knechtel et al. |
| 2009/0217031 A1* | 8/2009 | Kuhls ............... H04L 9/0822 |
| | | 713/153 |
| 2009/0323967 A1 | 12/2009 | Peirce et al. |
| 2012/0093312 A1 | 4/2012 | Gammel et al. |
| 2013/0030608 A1* | 1/2013 | Taylor ............... B60L 1/003 |
| | | 701/2 |
| 2013/0042295 A1 | 2/2013 | Kelly et al. |
| 2014/0115656 A1 | 4/2014 | Kim et al. |
| 2016/0203649 A1* | 7/2016 | Berkobin ............ G06Q 20/12 |
| | | 705/13 |

FOREIGN PATENT DOCUMENTS

| | | |
|---|---|---|
| DE | 102011076350 A1 | 11/2012 |
| DE | 102012015940 A1 | 2/2014 |
| DE | 102013006470 A1 | 10/2014 |
| WO | 2010031625 A1 | 3/2010 |
| WO | 2015007673 A1 | 1/2015 |

OTHER PUBLICATIONS

Search Report from German Patent Application No. 10 2016 210 788.7; dated Nov. 30, 2016.

* cited by examiner

COMPONENT FOR PROCESSING A PROTECTABLE DATUM AND METHOD FOR IMPLEMENTING A SECURITY FUNCTION FOR PROTECTING A PROTECTIVE DATUM IN SUCH A COMPONENT

PRIORITY CLAIM

This patent application claims priority to German Patent Application Nos. 10 2016 001 849.6, filed 18 Feb. 2016, and 10 2016 210 788.7, filed 16 Jun. 2016, the disclosures of which are incorporated herein by reference in their entirety.

SUMMARY

Illustrative embodiments relate to a component for processing a datum requiring protection, wherein the component implements at least one security function for protecting the datum requiring protection, and to a method for implementing a security function for protecting a datum requiring protection in such a component.

DETAILED DESCRIPTION

Figure 1:
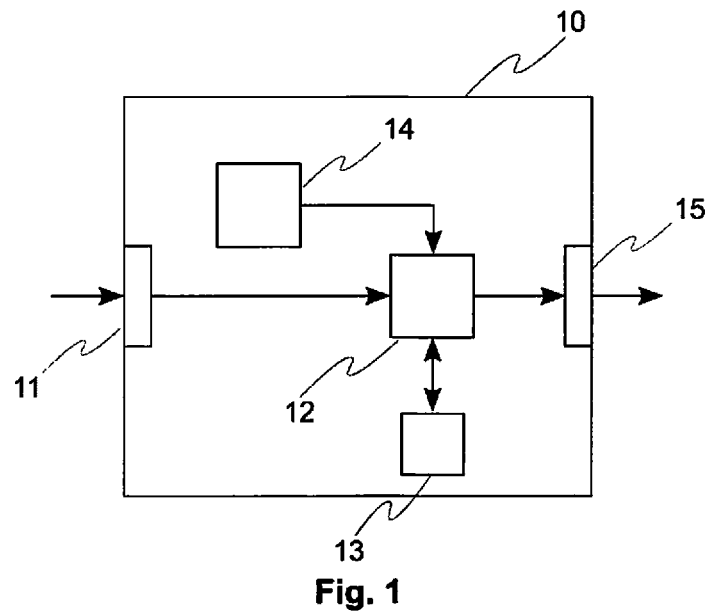
FIG. 1 shows a first exemplary embodiment of a component for processing a datum requiring protection.

The document DE 10 2007 058 975 A1 discloses a protected onboard power supply system for a motor vehicle. This prevents manipulation of the software of the various controllers. For this purpose, a first controller is provided with a master security module, and the further controllers are each provided with a client security module. The control modules interchange signed messages.

The document DE 10 2011 076 350 A1 discloses a method for identifying manipulation on a vehicle network. First of all, a digital fingerprint of the vehicle network is ascertained. This digital fingerprint is compared with reference information. On the basis of the result of the comparison, a regular control mode is activated if no manipulation has been identified, or a dependable control mode if manipulation has been identified.

The document WO 2015/007673 A1 discloses a method for automated or remotely controllable control of a safety-relevant system of a vehicle without there needing to be a driver capable of action onboard the vehicle. For this purpose, the communication between a requesting device, for example, a radio key or a mobile communication device, and an executing apparatus in the vehicle contains authentication information.

In today's systems with various internetworked components, for example, in motor vehicles having a multiplicity of controllers, a series of cryptographic functions of different quality is used. Often, this may require data to be stored in protected state, for example, cryptographic key material. Normally, the functions used provide appropriate protective measures. Since these protective measures can fail at a wide variety of points, however, for example, as a result of an incorrect storage location for the data, errors in the software or errors in the processes, it is a relatively complex matter to ensure that the call for protected storage of the data is implemented.

Disclosed embodiments provide a component for processing a datum requiring protection, which component ensures reliable implementation of at least one security function for protecting the datum requiring protection.

Disclosed embodiments further demonstrate a method for reliably implementing a security function for protecting a datum requiring protection in such a component.

According to one disclosed embodiment, a component for processing a datum requiring protection implements at least one security function for protecting the datum requiring protection, wherein the datum requiring protection is assigned to a protection target class and the security function comprises at least one protective measure from a selection of protective measures associated with the protection target class.

According to a further disclosed embodiment, a method for implementing a security function for protecting a datum requiring protection in a component for processing the datum requiring protection comprises the operations of:

determination of a protection target class assigned to the datum requiring protection;

selection of at least one protective measure from a selection of protective measures associated with the protection target class; and implementation of the selected protective measure in the component.

The definition of protection target classes and associated protective measures unifies the requirements on the protection functions centrally, so that each function does not have to impose its requirements itself. The protection target classes and protective measures reliably define what is intended to be understood by the desired dealings with a datum requiring protection. In this case, detailed requirements are imposed on hardware and software, but also on development, processes and quality measures, which ensure that the component affords the necessary security. This ensures that the data defined as requiring protection cannot be read or manipulated. The stipulated requirements may be based on empirical values from development regarding the points at which errors can typically result in shortcomings in the security of a component. This also considers processes in the development, not just the component in isolation.

According to at least one disclosed embodiment, the datum requiring protection is assigned to a protective measure. The security function then comprises at least the assigned protective measure. The generally valid requirements of the superordinate protection target class remain in force in this case. In this way, it is possible to stipulate, when needed, what protective measure absolutely needs to be implemented. Typically, multiple protective measures that all afford a minimum degree of protection are defined for a protection target class. However, individual functions can have particular, increased requirements. Function enabling perhaps has different requirements than theft prevention. Particular requirements can also come from the outside, e.g., the processing of payment information. For such situations, it makes sense to assign the relevant data requiring protection to specific protective measures. Superior measures are normally more expensive and, in terms of quality, can go beyond what the protection target class stipulates as a minimum degree. Therefore, superior measures of this kind should not be called for generally.

According to at least one disclosed embodiment, a datum from a first protection target class needs to be protected against unauthorized reading. A datum from a second protection target class needs to be protected against unauthorized manipulation. Data from the first protection target class are "confidential". These include, e.g., secret symmetric keys and private keys from an asymmetric key pair. Reading these data would allow further confidential data to be accessed. Data from the second protection target class are "authentic". These normally include, e.g., root certificates, global public keys or the serial number of the component. Manipulation of such data would allow the identity of a component to be falsified. The use of at least the two cited protection target classes allows the typical objectives of the protective functions to be covered.

According to at least one disclosed embodiment, a first protective measure involves the datum being persisted exclusively in a hardware security module of the component and being used only by the hardware security module. The terms of a second protective measure are that the datum is persisted, buffer-stored and used exclusively in an internal memory of the component. A third protective measure consists in the datum being persisted in encrypted and/or signed form. The three cited protective measures firstly allow the implementation of different protection levels, and secondly they take the different technical prerequisites of different components into consideration. By way of example, not every component necessarily has a hardware security module implemented in it.

According to at least one disclosed embodiment, if the component has an interface that grants read or write access to a datum requiring protection or allows manipulation of a computation unit of the component, then this interface is deactivated and safeguarded. The enabling of such an interface may require component-individual, dynamic authentication. This takes into consideration that the development of a component often requires developer access that grants read or write access to data requiring protection or cryptographic data. Following the conclusion of the development, such developer access needs to be deactivated and safeguarded in the standard production components.

Optionally, a disclosed component is used in a vehicle, particularly a motor vehicle.

Further features will become apparent from the description below and the appended claims in conjunction with the figures.

As an aid to better understanding of the principles, embodiments are explained in more detail below with reference to the figures. It goes without saying that the scope is not restricted to these disclosed embodiments and that the features described can also be combined or modified without departing from the scope of protection of the disclosure as defined in the appended claims.

FIG. 1 shows a simplified schematic depiction of a first disclosed embodiment of a component 10 for processing a datum requiring protection. The component 10 has an input 11 for receiving data and an output 15 for outputting data. The input 11 and the output 15 can connect the component 10 to further components. The input 11 and the output 15 may be implemented as separate interfaces or as a combined bidirectional interface. A security module 12 implements at least one protective function for a datum requiring protection that is assigned to a protection target class. The security function comprises at least one protective measure from a selection of protective measures associated with the protection target class. If the datum requiring protection is assigned exclusively to one protective measure, then the security function comprises at least the assigned protective measure. Optionally, at least two protection target classes are defined. Data from a first protection target class need to be protected against unauthorized reading, whereas data from a second protection target class need to be protected against unauthorized manipulation. One possible protective measure consists, e.g., in the datum being persisted exclusively in a hardware security module of the component and being used only by the hardware security module. The terms of a second protective measure are that the datum is persisted, buffer-stored and used exclusively in an internal memory of the component. A third protective measure provides for the datum to be persisted in encrypted and/or signed form. The functions, methods and protocols required for implementation are provided by a functional module 14, for example. They may alternatively be implemented in the security module 12 itself. Data processed by the security module 12 can be provided via the output 15. Furthermore, they can be stored in a memory 13 of the component 10. The security module 12 and the functional module 14 may be realized as dedicated hardware, for example, as integrated circuits. Naturally, they can alternatively be combined in part or in full or be implemented as software that runs on a suitable processor. If the component 10 has an interface that grants read or write access to a datum requiring protection or allows manipulation of a computation unit of the component, then this interface is deactivated and safeguarded. The enabling of such an interface may require component-individual, dynamic authentication.

Figure 2:
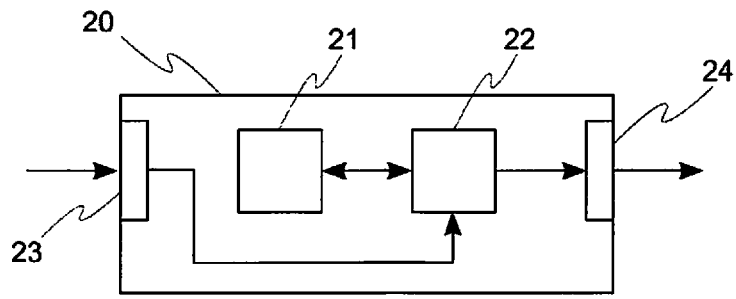
FIG. 2 shows a second exemplary embodiment of a component for processing a datum requiring protection.

FIG. 2 shows a simplified schematic depiction of a second disclosed embodiment of a component 20 for processing a datum requiring protection. The component 20 has a processor 22 and a memory 21. By way of example, the component 20 is a computer or a controller. The memory 21 stores instructions that, when executed by the processor 22, prompt the component 20 to implement a security function. The component 20 has an input 23 for receiving information. Data generated by the processor 22 are provided via an output 24. Furthermore, they can be stored in the memory 21. The input 23 and the output 24 may be combined to form a bidirectional interface.

The processor 22 can comprise one or more processor units, for example, microprocessors, digital signal processors or combinations thereof.

The memories 13, 21 of the disclosed embodiments described can have volatile and/or nonvolatile memory areas and comprise a wide variety of storage devices and storage media, for example, hard disks, optical storage media or semiconductor memories.

Figure 3:
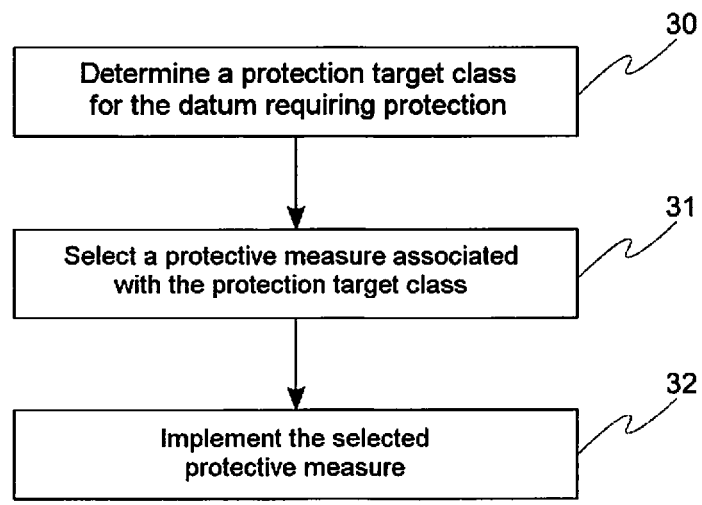
FIG. 3 schematically shows a method for implementing a security function for protecting a datum requiring protection in a component for processing the datum requiring protection.

FIG. 3 schematically shows a method for implementing a security function for protecting a datum requiring protection in a component for processing the datum requiring protection. In a first operation, a protection target class assigned to the datum requiring protection is determined 30. From a selection of protective measures that are assigned to the protection target class, at least one protective measure is then selected 31. If need be, the datum requiring protection is assigned exclusively to one protective measure. In this case, the security function comprises at least the assigned protective measure. The selected protective measures are finally implemented in the component 32. Optionally, at least two protection target classes are defined. Data from a first protection target class need to be protected against unauthorized reading, whereas data from a second protection target class need to be protected against unauthorized manipulation. One possible protective measure consists, e.g., in the datum being persisted exclusively in a hardware security module of the component and being used only by the hardware security module. The terms of a second protective measure are that the datum is persisted, buffer-stored and used exclusively in an internal memory of the component. A third protective measure provides for the datum to be persisted in encrypted and/or signed form. If the component has an interface that grants read or write access to a datum requiring protection or allows manipulation of a computation unit of the component, then this interface is deactivated and safeguarded. The enabling of such an interface may require component-individual, dynamic authentication.

A disclosed embodiment will be described in detail below. In this regard, a few terms and abbreviations will first of all be defined. Depending on the field of application and the security required, other cryptographic algorithms and methods can also be cleared as required or amended parameters can be stipulated for them.

Terms

CPU (Central Processing Unit): This is used as a standard term for any standalone computation unit (single-core or multicore), such as, e.g., μC, FPGA, HSM or regular CPU.

HSM (Hardware Security Module): An HSM is a dedicated piece of hardware for the protected persistence of cryptographic data and for performing cryptographic functions.

Persisting: Persisting denotes the storage of data in non-volatile memory (Flash, EEPROM, hard disk, etc.). This also includes the overwriting of existing data.

Individually per component: The value described is different for every component produced. Components mean individually produced, individual components, rather than a component family.

Cryptographic algorithms: This denotes mathematical primitives that process data, e.g., encryption functions or hash functions.

Cryptographic data: This denotes secret data that arise in the course of the use of cryptographic algorithms and methods, e.g., keys, round keys, random numbers and intermediate values.

Cryptographic methods: This denotes methods that are based on cryptographic algorithms, e.g., authentication methods or key derivation methods.

Cleared methods: This denotes cryptographic algorithms and methods that are expressly cleared for use.

Data requiring protection: This denotes data that need to be protected using protection concepts.

Random: The probability of a particular value being selected from a total range of possibilities is consistent with uniform distribution. In other words, every element has the same probability of being selected. Outputs from a cryptographically secure random number generator, as is described later on, are random.

Abbreviations

AES Advanced Encryption Standard
CA Certificate Authority
CAN Controller area network
CPU Central Processing Unit
EEPROM Electrically Erasable Programmable Read-Only Memory
EOL End of line
FPGA Field-programmable gate array
GCM Galois/Counter Mode
HSM Hardware Security Module
JTAG Joint Test Action Group
PKI Public Key Infrastructure
RAM Random-Access Memory
RSA Rivest-Shamir-Adleman
SHE Secure Hardware Extension
UART Universal asynchronous receiver/transmitter
XCP/CCP Universal Measurement and Calibration Protocol/CAN Calibration Protocol General Requirements A selection of cryptographic algorithms and methods are defined for the development of components. Exclusively these cryptographic algorithms and methods are cleared for use in protection concepts. All protection concepts that are affected by the requirements below must be based on these algorithms and methods.

Hardware in the Component

Cryptographic functionality and secure software cannot be implemented without secure hardware as a trust anchor. It is therefore necessary for the hardware of the component to have security properties in accordance with the protective measures called for.

If multiple physically separate CPUs are involved in cryptographic functions or protection concepts, then every single one must meet the requirements described below. The communication between them needs to be protected in accordance with the protection target class of the transmitted data requiring protection.

An internal memory is by definition a memory that can be used exclusively by the CPU to which it is assigned and that otherwise cannot be accessed (read or write) without destroying the CPU. Reading the data stored therein or deliberate modification is not possible from the outside even by making direct contact with the CPU.

This category usually covers Flash memory and RAM if they are located directly on the CPU and they cannot be accessed from outside the CPU even by making direct contact. The memory of an HSM located directly on the CPU is likewise covered by this category.

What do not count as internal memory are, e.g., external RAM outside the CPU, external EEPROM, Flash or other persistent memories or memories on other CPUs.

In some cases, components call for authenticated booting. For a component that contains multiple CPUs, it is stipulated which of them needs to implement secure booting.

A CPU that processes data requiring protection needs to support secure booting on the basis of the cleared methods to ensure the integrity of protection-relevant software.

A protected boot process needs to be used. This needs to cryptographically verify at least the software whose integrity is necessary for secure execution of cryptographic operations. The protection concept needs to stipulate the behavior of the component in the event of a failed boot process. In the case of error, it is possible, e.g., for the component to be put into a mode that only allows flashing of the component for restoration (secure boot), or for access to key material to be blocked.

The protected boot process must comprise the whole boot path from power-up of the component to executing software and static configuration data inclusive. The protected boot process therefore needs to comprise the following, inter alia:

all bootloaders, e.g., startup loader, bootloader, tier 1 bootloader, customer bootloader, OEM bootloader;
operating system;
application software;
any data that are relevant to the execution of the aforementioned software (configuration files etc.).

Efficient implementation can be effected, e.g., by a boot process in multiple stages that involves the respective preceding stage checking the authenticity of the next stage before the latter is started. The exact implementation is dependent on the capabilities of the CPU.

Software and data that are stored in OTP memory (OTP: one time programmable) directly on the CPU do not need to be verified.

In some cases, components have a hardware-accelerated cryptographic functionality or an embedded HSM.

Embedded HSMs cover a broad spectrum, from simple key memory with an associated state machine for cryptographic operations, such as, e.g., the secure hardware extension, to integrated dedicated runtime environments with their own CPU specifically for cryptographic operations.

It should be noted that an external HSM, which is not part of the CPU, is considered and treated as an external CPU. Therefore, calls to such HSMs by the CPU need to be effected in authenticated and if need be encrypted form as described above.

If the HSM is part of the CPU, then it is necessary for the CPU to implement authenticated booting as described above or for the HSM to check the state of the surrounding CPUs, the aforementioned requirements likewise applying to the measures in the case of error.

Protection Target Classes for Data Requiring Protection

The data requiring protection are classified using different protection target classes.

A datum is assigned to one of at least two protection target classes, the protection target class "confidential" or the protection target class "authentic". Additionally, the datum may also be assigned to a specific protective measure. If this is not the case, then the datum can be protected by freely selecting between the protective measures associated with the protection target class.

If a datum is also assigned to a protective measure, then the datum needs to be protected in accordance with exactly this protective measure. The generally valid requirements of the superordinate protection target class remain in force in this case. The developer of a component needs to ensure that the architecture of the component allows implementation of the protection target classes and protective measures called for. In this case, it is additionally necessary to ensure that the data requiring protection are also protected in accordance with their protection target class during use within the component.

"Confidential" Protection Target Class

Data requiring protection in the "Confidential" protection target class are data that need to be protected against unauthorized reading. These include, e.g., all secret symmetric keys and private keys from an asymmetric key pair.

For the "Confidential" protection target class, three protective measures V.1 to V.3 are defined.

Protective Measure "V.1" (HSM)

The data requiring protection are persisted exclusively in an internal HSM of the CPU and are used only by the internal HSM. Access to the data requiring protection is possible only by the HSM. Other programs that run on the CPU have no read or write access thereto.

Protective Measure "V.2" (Internal Memory)

The data requiring protection are persisted, buffer-stored and used exclusively in internal memory.

Protective Measure "V.3" (Encrypted and Authenticated Memory)

The data requiring protection are persisted in encrypted and signed form using a cleared method.

In this case, at least one of the following statements is true:

The data requiring protection and their signature do not change over the life of the component.

The signature or a hash for the data requiring protection are data from the "Authentic" protection target class and are protected by means of protective measure "A.1" or "A.2" as described later on.

Every loading process for the data requiring protection requires the associated signature or the hash to be checked. If the value is incorrect, then the datum is corrupt and cannot be used. This case needs to be taken into consideration during development and is part of the protection concept.

The encrypted data requiring protection, excluding the associated signature or the hash, can be persisted in any type of memory.

The decrypted data requiring protection are buffer-stored and used exclusively in internal memory.

The keys that are used for encrypting and (if used) signing the data requiring protection in the component are data from the "Confidential" protection target class and protected by means of protective measure "V.1" or "V.2".

The keys that are used for encrypting and (if used) signing the data requiring protection in the component are random and individual for each component.

"Authentic" Protection Target Class

Data requiring protection in the "Authentic" protection target class are data that need to be protected against unauthorized manipulation. These normally include, e.g., root certificates, global public keys or an identity anchor of the component, for example, the serial number thereof.

Three protective measures A.1 to A.3 are defined for the "Authentic" protection target class.

Protective Measure "A.1" (HSM)

The data requiring protection are persisted exclusively in an internal HSM of the CPU. Other programs that run on the CPU have no write access thereto.

Protective Measure "A.2" (Internal Memory)

The data requiring protection are persisted exclusively in internal memory.

Protective Measure "A.3" (Authenticated Memory)

The data requiring protection are persisted in signed form using a cleared method. In this case at least one of the following statements is true:

The data requiring protection and their signature do not change over the life of the component.

The signature or a hash for the data requiring protection are data for the "Authentic" protection target class and are protected using protective measure "A.1" or "A.2".

Every loading process for the data requiring protection requires the associated signature or the hash to be checked. If the value is incorrect, then the datum is corrupt and cannot be used. This case needs to be taken into consideration during development and is part of the protection concept.

The data requiring protection, excluding the associated signature or the hash, can be persisted in any type of memory.

If a signature is used, then the signing key in the component needs to be protected according to the "Confidential" protection target class using protective measure "V1" or "V2".

If a signature is used, then the key in the component that is used for signing the data requiring protection needs to be random and individual for each component.

Figure 4:
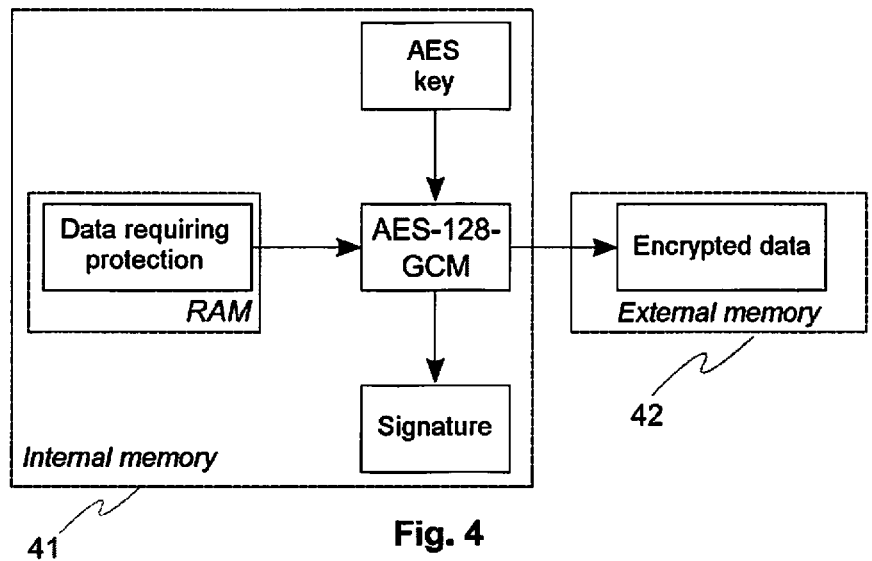
FIG. 4 shows the production of a protected area in an unprotected memory.

An implementation example for the production of a protected area in an unprotected memory is explained below with reference to FIG. 4. This approach is useful if the protected memory 41 that is already available is not sufficient, but further unprotected memory 42 is available.

AES-GCM is used to encrypt and sign the data requiring protection. The cryptographic key therefor has the protection target classes "Confidential" and "Authentic", is located in the internal memory 41 of the CPU and is therefore adequately protected in accordance with protective measure "V.1". The encrypted data can be stored in the unprotected external memory 42. The associated signature has protection target class "Authentic" and is stored in the protected memory 41. This is consistent with protective measure "A.1". It is therefore not possible to manipulate the data stored in the unprotected external memory 42 unnoticed.

Fresh loading of the encrypted data requires the stored signature thereof to be checked. All cryptographic operations and data that arise in this method are not permitted to leave the protected memory 41.

Instead of AES-GCM, it is possible to use other encryption and signing methods if they meet the previously defined requirements.

Figure 5:
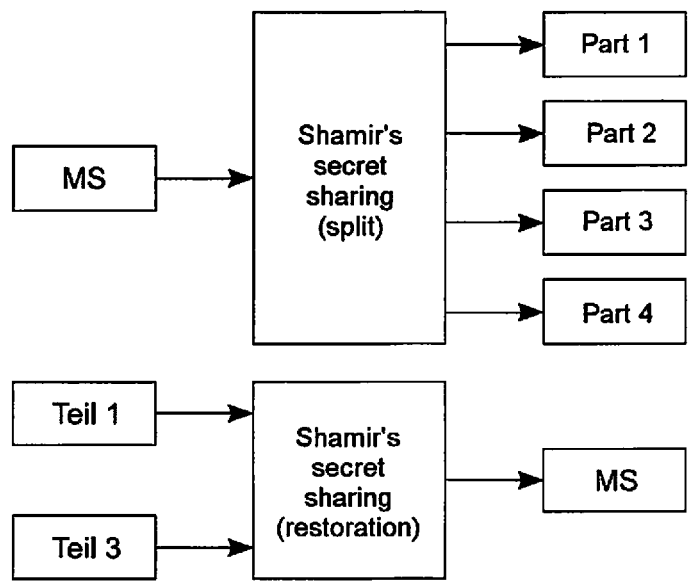
FIG. 5 illustrates the creation of protected security copies by secret sharing.

An example of the production of protected security copies by secret sharing is depicted in FIG. 5. This method involves Shamir's secret sharing method being used to divide a secret key into multiple parts. In the example in FIG. 5, a master key MS for component key derivation is divided into four parts, at least two of which are needed to restore the master key. These numbers are merely exemplary. A secret can be divided into an arbitrary number of parts of which, in turn, an arbitrary stipulated number is needed to reconstruct the secret.

Both the master key and the emerging parts are data in the "Confidential" protection target class that need to be protected using appropriate methods. Specifically, the parts can be stored in different HSMs and may be personalized for individual employees. They likewise need to be kept in a protected environment (e.g., security cabinet).

Privileged Access and Debug Interfaces

Access to all interfaces that grant read or write access to data requiring protection or cryptographic data, that is to say to the internal memory of the CPU, or allow manipulation of the CPU needs to be deactivated and safeguarded in standard production components.

These interfaces include: JTAG, UART, proprietary diagnosis of the developer of the component, consoles, tier 1 bootloader, XCP/CCP, etc.

The enabling of such an interface must require component-individual, dynamic authentication and be based on cleared methods.

If such enabling of developer access or similar accesses is implemented and this involves keys being introduced by the contractor, then all the measures described in the section "Data handling outside the component" later on need to be implemented.

A concept for such enabling must contain the criteria for the expiry of such enabling. Enabling may, e.g., be limited by time, can be maintained until the component is restarted, or needs to be explicitly deactivated again.

Figure 6:
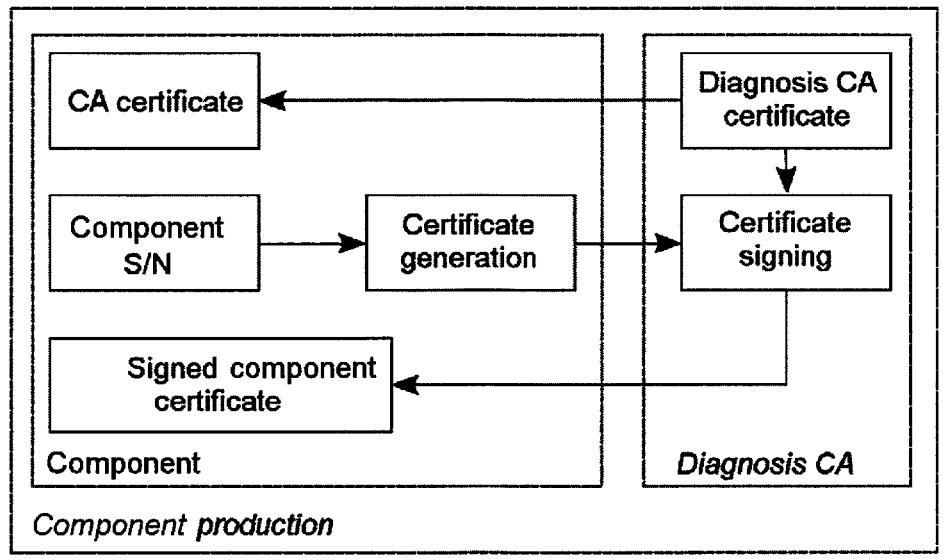
FIG. 6 shows a public key infrastructure for bilaterally authenticated diagnosis as part of production of the component.
Figure 7:
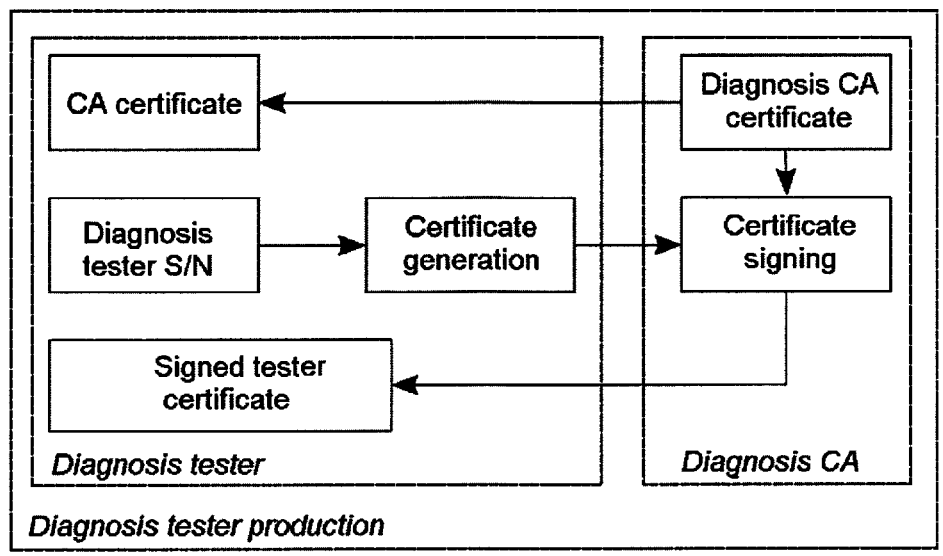
FIG. 7 shows a public key infrastructure for bilaterally authenticated diagnosis as part of diagnosis tester production.

An example of an enabling concept using a PKI will be described below with reference to FIG. 6 and FIG. 7. The figures show a simple PKI with bilateral authentication for the use of a developer interface for implementing a proprietary diagnosis of the developer of the component as part of production of the component (FIG. 6) and the production of a diagnosis tester (FIG. 7).

During production, the component generates (or obtains) a certificate that contains a public key and is signed by a diagnosis CA, and also the associated private key. In addition, the CA certificate for the diagnosis CA is introduced into this software. The CA certificate and the certificate of the component are data from the "Authentic" protection target class. Their associated private keys are data from the "Confidential" and "Authentic" protection target classes.

Accordingly, appropriate protective measures need to be implemented both in the component and in the diagnosis CA.

Equally, a diagnosis tester of the developer contains a signed diagnosis tester certificate that contains a public key, the associated private key and the diagnosis CA certificate. In this case too, the public certificates are data from the "Authentic" protection target class and the associated private keys are data from the "Confidential" and "Authentic" protection target classes.

The signed certificates can then be used for authenticated diagnosis. As soon as a diagnosis tester of the developer connects to a component, both sides can reciprocally prove their identity and function (component, tester, etc.) using their certificates. The validity of the certificates can be checked using the stored diagnosis CA certificate. In addition, the signed public keys that the certificates contain can be used to perform authenticated key interchange. The resultant shared key can then be used for encrypted and signed communication.

Data Handling in the Component

The software of the component is a datum from the "Authentic" protection target class.

Symmetric keys and private keys from an asymmetric key pair that are introduced into components must be individual and random. The granularity of the keys is stipulated as required.

Cryptographic data or data requiring protection, or volatile copies thereof, need to be overwritten with zero values after they are no longer absolutely needed.

Symmetric keys are data from the "Confidential" and "Authentic" protection target classes. Private keys from asymmetric key pairs are data from the "Confidential" and "Authentic" protection target class. Public keys of a component are data from the "Authentic" protection target class. Global public keys (e.g., of the developer) are data from the "Authentic" protection target class. Other cryptographic data such as intermediate values of cryptographic functions, internal states of random number generators, etc. are data from the protection target class of their key that is used.

An unauthorized party must not be able to intercept protected or cryptographic data from the "Confidential" protection target class in plain text by monitoring lines on the circuit board of the component.

Data Handling Outside the Component

If the developer produces, uses or manages secret key material (e.g., private keys for signing, component-individual keys, etc.) or data requiring protection outside the component, then it is necessary, depending on the function of a cryptographic key, for restrictions to the use thereof to be implemented, for example:

limited number of uses;

time limit on use;

use only with at least the "4-eye principle";

personalization for individual employees; different authorities per user;

restricted number of users;

use of HSM customary in IT for protecting the keys;

manipulation-proof logging of use.

Cryptographic keys must never be stored or transmitted in plain text outside an HSM, but rather need to be protected using one of the cleared methods. This requirement does not necessarily apply to development keys (see below) that are not used in productive environments and are not introduced into productive components. As follows, it additionally does not apply to the period of first provisioning of components with secret keys by the developer. If cryptographic secret keys for a component are generated outside the component during production of the component and are also introduced into the component at that location, then access to the key generator and to the transmission path needs to be restricted to as small a group of people as possible. In just precisely this case, transmission of the keys to the component for first provisioning with key material is also permitted in plain text.

The exact method of key generation and transmission and the number of people with access to the key generator and transmission path are stipulated as required.

If a developer or third party is to be granted access to the private key of an asymmetric key pair, e.g., for test purposes, then two versions of each global cryptographic key, e.g., for authenticated booting, must exist:

a development key that is used only on development components during development and that is not valid in productive environments; this key can be issued by the customer;

a serial key that is used only on production components; this key must not be issued by the customer.

The introduction of development keys into production components is considered as a developer interface in line with the "privileged access and debug interfaces" section and needs to be protected accordingly.

Software Development

Software that processes data whose origin is outside the component needs to be tempered by security-oriented programming standards. At the very least, the MISRA C and MISRA C++ standards must be observed.

Static code analysis tools need to be used to find programming errors that can lead to security problems.

A library needs to be used that provides the necessary cryptographic functionality. This may include a piece of standard software possibly provided for the developer, which needs to be used as first choice.

To use cryptographic methods, the most abstract function of the library must always be used. If the library provides, e.g., a function for verifying a signature, then this needs to be used instead of following the operations for verifying using low-level functions themselves. In the case of RSA, for example, it would not be permitted to perform the necessary operations, such as exponentiation, padding check, etc., instead of calling the RSA verification function directly.

If the operating system used on the component provides a user management system, then this needs to be used, so that it is certain that only privileged processes can be provided with access to data requiring protection and cryptographic data. In addition, access to protection-relevant hardware such as HSM, CAN bus I/O, etc. needs to be restricted.

In addition, measures need to be implemented that ensure that the memory areas of privileged processes of this kind cannot be accessed by other processes.

All processes need to be restricted to the minimum rights that they need for performing their functionality.

The invention claimed is:

1. A hardware component for processing a datum requiring protection, wherein the component is configured to:

implement at least one security function for protecting the datum, wherein the security function comprises at least one protective measure from a selection of protective measures associated with a protection target class, by performing the method of:

determining the protection target class assigned to the datum requiring protection;

selecting at least one protective measure from the selection of protective measures associated with the protection target class;

wherein the datum requiring protection is assigned to a protective measure and the security function comprises at least the assigned protective measure;

wherein a datum from a first protection target class requires protection against unauthorized reading and a datum from a second protection target class requires protection against unauthorized manipulation; and wherein the terms of a first protective measure are that the datum is persisted exclusively in a hardware security module of the component and is used only by the hardware security module, the terms of a second protective measure are that the datum is persisted, buffer-stored and used exclusively in an internal memory of the component, and the terms of a third protective measure are that the datum is persisted in encrypted and/or signed form.

2. The component of claim 1, wherein, if the component has an interface that grants read or write access to a datum requiring protection or allows manipulation of a computation unit of the component, then this interface is deactivated and safeguarded.

3. The component of claim 2, wherein the enabling of such an interface requires component-individual, dynamic authentication.

4. A method for implementing a security function for protecting a datum requiring protection in a hardware component for processing the datum, the method comprising:

determining a protection target class assigned to the datum requiring protection;

selecting at least one protective measure from a selection of protective measures associated with the protection target class; and implementing the selected protective measure in the component;

wherein the datum requiring protection is assigned to a protective measure and the security function comprises at least the assigned protective measure;

wherein a datum from a first protection target class requires protection against unauthorized reading and a datum from a second protection target class requires protection against unauthorized manipulation; and wherein the terms of a first protective measure are that the datum is persisted exclusively in a hardware security module of the component and is used only by the hardware security module, the terms of a second protective measure are that the datum is persisted, buffer-stored and used exclusively in an internal memory of the component, and the terms of a third protective measure are that the datum is persisted in encrypted and/or signed form.

5. The method of claim 4, wherein an interface of the component that grants read or write access to a datum requiring protection or allows manipulation of a computation unit of the component is deactivated and safeguarded.

6. The method of claim 5, wherein the enabling of such an interface requires component-individual, dynamic authentication.

7. A motor vehicle comprising:

a hardware component for processing a datum requiring protection, wherein the component is configured to:

implement at least one security function for protecting the datum, wherein the security function comprises at least one protective measure from a selection of protective measures associated with a protection target class, by performing the method of:

determining the protection target class assigned to the datum requiring protection;

selecting at least one protective measure from the selection of protective measures associated with the protection target class;

wherein the datum requiring protection is assigned to a protective measure and the security function comprises at least the assigned protective measure;

wherein a datum from a first protection target class requires protection against unauthorized reading and a datum from a second protection target class requires protection against unauthorized manipulation; and wherein the terms of a first protective measure are that the datum is persisted exclusively in a hardware security module of the component and is used only by the hardware security module, the terms of a second protective measure are that the datum is persisted, buffer-stored and used exclusively in an internal memory of the component, and the terms of a third protective measure are that the datum is persisted in encrypted and/or signed form.

8. The motor vehicle of claim 7, wherein, the component has an interface that grants read or write access to a datum requiring protection or allows manipulation of a computation unit of the component, then this interface is deactivated and safeguarded.

9. The motor vehicle of claim 8, wherein the enabling of such an interface requires component-individual, dynamic authentication.

* * * * *